July 1, 1952 K. J. MAGNUSSON 2,601,790
FILM SHRINKAGE COMPENSATORY DRIVING SPROCKET
Filed Sept. 1, 1948 5 Sheets-Sheet 1

Inventor
Knut J. Magnusson
By [signature]
Attorney

July 1, 1952   K. J. MAGNUSSON   2,601,790
FILM SHRINKAGE COMPENSATORY DRIVING SPROCKET
Filed Sept. 1, 1948   5 Sheets-Sheet 3

Inventor
Knut J. Magnusson
By
Attorney

July 1, 1952 K. J. MAGNUSSON 2,601,790
FILM SHRINKAGE COMPENSATORY DRIVING SPROCKET
Filed Sept. 1, 1948 5 Sheets-Sheet 5

Inventor
*Knut J. Magnusson*
By
Attorney

Patented July 1, 1952

2,601,790

UNITED STATES PATENT OFFICE 2,601,790

FILM SHRINKAGE COMPENSATORY DRIVING SPROCKET

Knut Johan Magnusson, Princeton, N. J., assignor to Radio Corporation of America, a corporation of Delaware Application September 1, 1948, Serial No. 47,183

8 Claims. (Cl. 74—244)

The present invention relates to motion picture film driving mechanisms and more particularly to drive systems designed to compensate for film shrinkage effects in motion picture film television scansion apparatus.

The use of motion picture film for television program material is becoming more and more prevalent as the art progresses and as its use becomes more important, more stringent requirements are being exacted of equipment employed to faithfully transform the motion picture photographic information into television video signals. Presumably, if the quality of motion picture film photographic records is kept reasonably high and a photoelectric system which is faithful in responding to the range of film densities borne by the film is employed in the film scansion, the quality of the reproduced television image at the present state of the art will be at least as good, if not better than the television image produced from camera tubes operating directly from the scene to be televised. This, of course, presupposes that the noise level introduced into the picture by the scansion mechanism is kept reasonably low and that uniform photoelectric response over the entire film frame area is achieved.

Recent developments have indicated that a flying spot scansion system applied to continuously moving motion picture film provides an exceptionally high quality of television image which is unusually free from objectionable shading effects and evidence a minimum of random noise attributable to photoelectric effects. However, even with the improvements to be derived from flying spot scansion of continuously moving film, the quality of the reproduced television image generally suffers degradation as the result of film shrinkage due to change in humidity, temperature, and aging of the film material. As will be more fully appreciated hereinafter in a continuous film motion type of scanner or projection system, film shrinkage effects normally may cause serious misregistration of successive film frames or sections thereof.

Since the standards of the motion picture film industry have been set at a film frame projection or presentation rate of 24 frames per second while television systems employ field scansion rates different from 24 frames per second (RMS television standards in United States requiring an interlaced 30 frames per second by means of 60 field scansions per second), it is normally required to provide some means of resolving the 24 frame per second reproduction of the motion picture film to the field transmission characteristics of the television system. A number of methods for accomplishing this resolution have been proposed a few of which are discussed by E. W. Engstrom, G. C. Beers, and A. V. Bedford in an article entitled "Application of motion picture film to television" published in the Journal of the Society of Motion Picture Engineers for June 1930. Other projection schemes of this type are discussed by Fordyce Tuttle and Charles D. Reid in the "Problem of motion picture projection from continuously moving film" in the same journal for February 1932. Furthermore, a copending U. S. application by A. V. Bedford and G. C. Sziklai entitled "Television Film Scanners," Serial No. 43,986, filed August 13, 1948, now Patent No. 2,590,281, granted March 25,1952, provides additional improvements in the television scansion of moving film. However, each method of scanning motion picture film, presently known to the art is vulnerable to the deleterious effects on the image quality produced by film shrinkage. Certain steps may, however, be taken to compensate for film shrinkage, especially in connection with non-intermittent scansion systems. Such considerations are dealt with in detail in a U. S. patent application by A. V. Bedford, Serial No. 44,013 filed August 13, 1948, entitled "Film Shrinkage Compensatory System." The general shrinkage problem is treated at length in this last referred to U. S. patent application and a novel method is presented which permits substantial reduction in image misregistration due to film shrinkage. Also, a general form of novel film driving sprocket is disclosed which incorporates mechanical features which permit operation and correction in accord with the method of shrinkage compensation disclosed therein.

The present invention chiefly concerns itself with an improved and simplified form of film shrinkage compensatory driving system finding particular use in non-intermittent motion picture film scansion systems and although operating in accordance with the teachings of above U. S. patent application Serial No. 44,013 supra, it does offer marked novel mechanical and operational advantages thereover.

More particularly the present invention provides a method of motion picture film propulsion for television scanning systems which compensates for film shrinkage effects by interrupting the passage of the film through the scanning apparatus during predetermined intervals whose timing is in synchronism with the scansion function of the apparatus. In one of its more practical forms the invention provides the aforementioned suspensions in film motion through the action of a novel film driving sprocket adapted to drivingly engage the motion picture film driving perforations. The sprocket driving teeth are movable with respect to the surface of the sprocket and a mechanism is provided for controlling the positioning of the teeth while the sprocket is in driving relationship with the film such that driving engagement of particular teeth on the sprocket with the film may be interrupted, with consequent momentary suspension of film motion. As will be seen more clearly as the specification proceeds, this action is controlled and timed in accordance with the Bedford U. S. patent application, supra, to substantially compensate for film shrinkage effects in television scansion system.

It is therefore an object of the present invention to provide a motion picture film sprocketing system adapted for use in connection with continuous film motion television scansion apparatus wherein the sprocketing system produces a series of momentary suspensions in film motion of a predetermined time duration and timing, such as to improve the registration of portions of reproduced television images when the scansion is under the influence of film shrinkage.

It is another purpose of the present invention to provide a motion picture film propulsion system for application in television motion picture film scansion systems whereby compensation for film shrinkage effects is automatically and continuously provided.

Another object of the present invention resides in the provision of a simple means for synchronizing successive interruptions of film passage through continuous film motion television scansion apparatus so as to occur only during television blank out intervals, whereby compensation for film shrinkage effects may be made during these intervals without impairing the appearance of reproduced television image obtained therefrom.

It is further a purpose of the present invention to provide a mechanical sprocket having movable teeth thereon adapted to engage the film driving perforations in motion picture film, the position of said teeth relative to the surface of said sprocket being controllable to conditionally disengage certain film driving perforations at predetermined time intervals for predetermined time durations.

It is further an object of the present invention to provide a mechanical sprocket having movable driving teeth thereon for driving engagement of motion picture film driving perforations, said sprocket being adapted for use in motion picture film television scansion systems of the continuous film motion variety, said sprocket having a control mechanism adapted for actuation externally to the sprocket teeth thereon according to a predetermined pattern such to provide driving engagement of the motion picture film by only one sprocket tooth at a time, whereby definition defects in reproduced television images due to film shrinkage effects are reduced.

Still another object of the instant invention resides in certain improvements in the mechanical design of a shrinkage compensatory film driving sprocket over and above the form of sprocket disclosed in a U. S. patent application by A. V. Bedford Serial No. 44,013 filed August 13, 1948, entitled "Film Shrinkage Compensatory System."

Other advantages and features which are believed to be characteristic of the present invention will become apparent through the perusal of the following specification, particularly when considered in connection with the accompanying drawings wherein.

Figure 1:
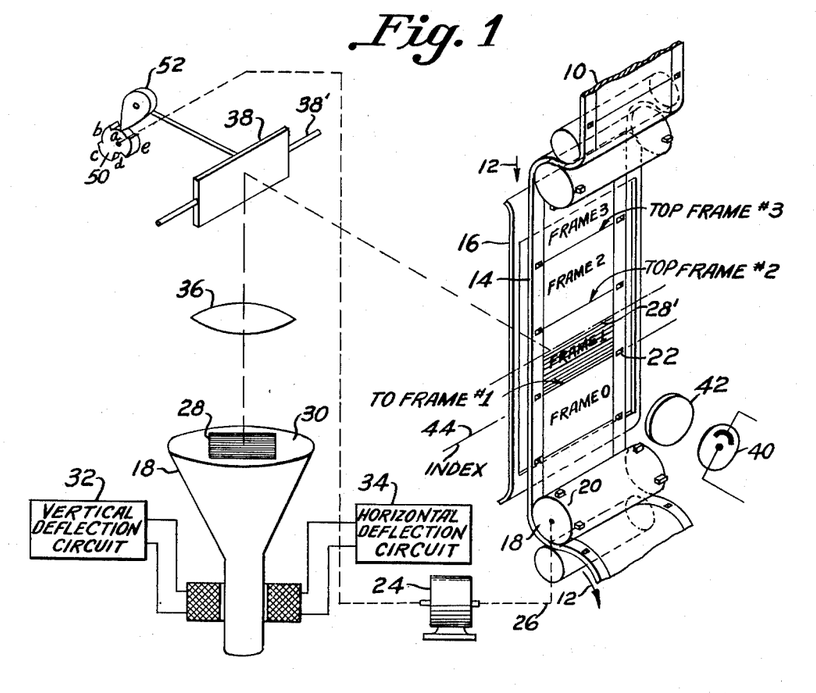
Figure 1 illustrates one form of film scansion system to which the present invention may be applied.
Figure 2:
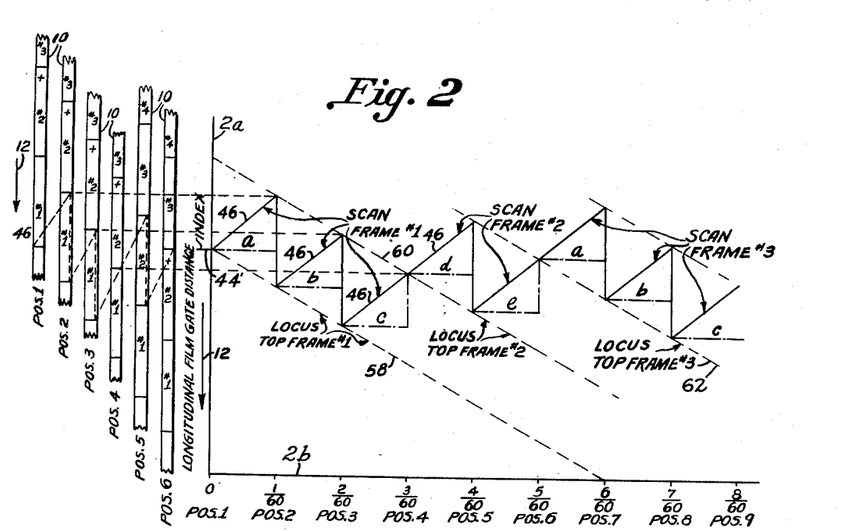
Figure 2 is a graphical representation of certain normal mechanical functions typical of the apparatus shown in Figure 1.

Referring now to Figure 1, wherein is shown a basic flying spot continuous film motion television scansion system, motion picture film 10 is being impelled in the direction of the arrows 12 past an aperture 14 in a film gate 16 by means of a sprocket 18 having teeth 20 adapted for driving engagement of the film driving perforations such as 22. The sprocket 18 is provided with rotational force by means of motor 24 which is indicated as being mechanically linked to the driving sprocket 18 by means of the dashed line at 26. In accordance with well-known principles of flying spot film scansion, one form of which is described in full detail by U. S. Patent No. 2,261,848 granted to P. C. Goldmark, issued of the flying spot as it scans a film frame, clearly illustrate the fact that successive film frames are properly in registration inasmuch as the extremities of these curve portions 46 lie on the locus lines 58, 60, and 62.

Figure 5:
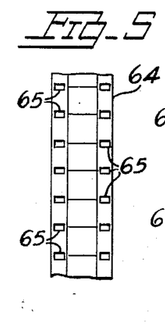
Figure 5 represents a section of 16 mm. motion picture film.
Figure 6:
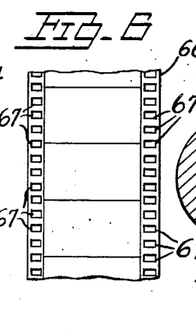
Figure 6 represents a section of 35 mm. motion picture film.

There is shown in Figures 5 and 6 respective sections of 16 mm. and 35 mm. motion picture film. It is noticed that the 16 mm. film 64 is provided with driving perforations 65 on the basis of one driving perforation per film frame, whereas the 35 mm. film 66 is provided with driving perforations 67 on the basis of four perforations per frame. The present invention is no way limited to the type of film used, but for sake of clarity and ease in comprehension, further description of the operation of the present invention will be directed to the use of 16 mm. film unless otherwise noted. Accordingly, in Figure 1, 16 mm. film is illustrated and although it is evident that the graph of Figure 2 is not in any way conditional upon the number of driving perforations per film frame, it does assume that the film 10 is being driven at a constant linear rate which for 16 mm. film is approximately 40 feet per second for 24 frame per second presentation rate.

Figure 7:
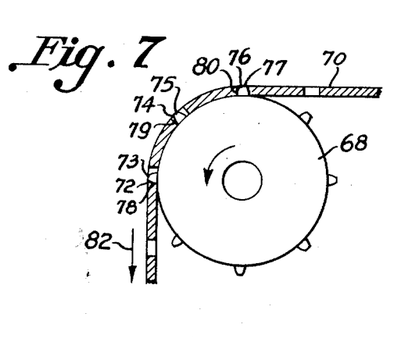
Figure 7 diagrammatically illustrates the mechanical relationship between a normal driving sprocket and normal motion picture film.

Figure 7 illustrates the relation between a film sprocket such as 68 and motion picture film when properly driving an unshrunken motion picture film such as 70. It is seen that the leading edge of the teeth 72, 74, and 76 of the sprocket teeth 73, 75, and 77 are all in driving contact with the leading edges 78, 79, and 80 of the respective film sprocket driving perforations. Under such conditions the movement of the film 70 in direction of the arrow 82 by rotation of the sprocket 68 will be substantially at a constant linear rate. However, in Figure 8, the same sprocket 68 is shown in connection with a shrunken film 70'. It is then seen that only the leading edge 72 of the sprocket tooth 73 is in driving contact with the leading edge 78 of the film 70', while the other teeth 75 and 77 although necessarily engaged in the sprocket perforations, are not in contact with the respective leading edges 79 and 80 thereof. Hence, the sole driving force to the film is being applied by the leading edge of the sprocket tooth 73 as the film 70' progresses in the direction of the arrow 82. It is evident that upon further rotation of the sprocket, sprocket tooth 73 will disengage its film sprocket perforation, whereupon the film 70' will tend to halt due to lack of driving contact with either of the other teeth 75 or 77. Hence, neglecting friction effects between film and sprocket and inertia, the film 70' will remain stationary until the leading edge 74 of the sprocket tooth 75 moves sufficiently forward to contact the leading edge 79 of its film perforation, at which time constant velocity propulsion of the film will again be provided until such time as the sprocket tooth 75 disengages its film driving perforation. As a result of this action the shrunken film 70' is transported past the film gate 16 in Figure 1 with a series of hesitations, each hesitation or film halt being in duration proportional to the degree of shrinkage manifested by the film with said hesitations occurring once per film frame.

Figure 3:
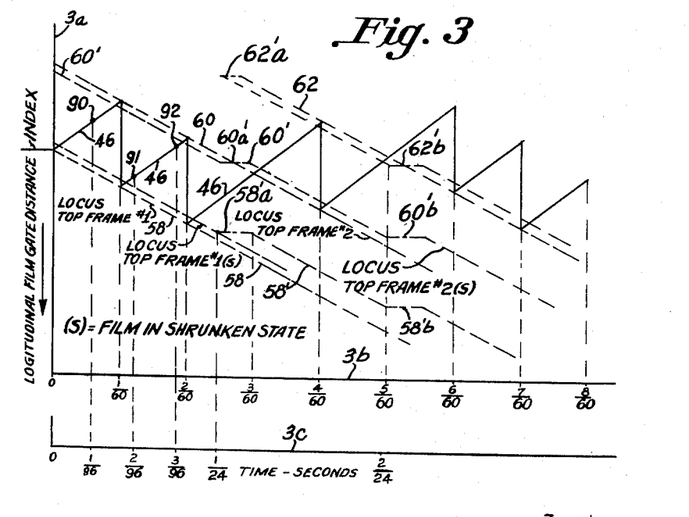
Figure 3 graphically illustrates the mechanical functions set forth in Figure 2 in connection with abnormal mechanical operation of the apparatus in Figure 1 due to film shrinkage.

Turning now to Figure 3 the effects of this film shrinkage will be considered in connection with the scanning cycle hereinbefore described with reference to Figure 2. The dashed lines 58, 60, and 62 corresponding to the loci of the tops of frames 1, 2, and 3 respectively are again shown in their proper relationship to the scanning curve 46 for an unshrunken film. The redrawing of this dashed line loci has been executed simply for illustrative purposes. Now under the conditions of shrunken film the distances between the top and bottom of the respective frames due to the shrinkage of the film material therebetween will be reduced. The top of frame 1 of a shrunken film is indicated by the "dashed-dot" locus line 58' whereas the top of frame 2 under shrunken film conditions may be represented by the "dashed-dot" locus line 60'. The ordinate 3a of the graph in Figure 3, of course, represents longitudinal film gate distance as did the ordinate 2a in Figure 2 and the abscissa 3b is a time scale broken in 60ths of a second again in accordance with Figure 2. An additional abscissa 3c for co-operation with the ordinate 3a is provided as a secondary time scale and is subdivided into 24ths of a second. The first 24th of a second is in turn broken into 96ths of a second for reasons of convenience hereinafter to become evident.

The fact that the shrunken film as it is impelled past the film gate hesitates every $\frac{1}{24}$ of a second as before brought out, may be illustrated by the horizontal sections 58'a, 60'a and 62'a, of the "dashed-out" loci of the tops of the shrunken film frames 1, 2, and 3. This illustration further shows that at the end of the first 24th of a second the film actually stands still, for all practical purposes, until the next sprocket tooth drivingly engages the film, at which time the film is driven at a constant linear speed until the next hesitation occurring at $\frac{2}{24}$ second shown at 58'b, 60'b, and 62'b.

The film hesitations produced by film shrinkage effects, even under conditions of severe film shrinkage, persist for a time duration of substantially less than a vertical blanking interval and therefore the delay intervals as depicted in Figure 3 by the horizontal sections of the dashed loci lines, such as 58'a, are obviously grossly exaggerated in order to lend clarity to the illustration. For example, under conditions of 1% film shrinkage, the film would hesitate approximately 1% of $\frac{1}{24}$ of a second or $.01 \times .04 = .0004$ second, whereas the vertical blanking interval for a standard television signal is about 5% of $\frac{1}{60}$ of a second or $.05 \times .016 = .0008$ second. Thus, it appears that for film shrinkage as large as 1%, the maximum duration of film shrinkage compensatory halts would not be greater than $\frac{1}{2}$ of a vertical blanking interval. Furthermore, the halt intervals as represented by the horizontal sections of the film frame loci are depicted as being rather abrupt transitions from normal 24 frame per second film propulsion to a stationary mode and then followed by rapid acceleration up to the normal propulsion rate again. Obviously, in practice the inertia of the film itself would prevent such rapid deceleration and acceleration, thereby making the halt intervals more properly representable by a slowing down of the film propulsion rather than an actual film halt. However, to more clearly illustrate the principles underlying the operation of the present invention, an exaggerated halt period, as shown in Figure 3 as well as hereinafter depicted in Figure 9, has been utilized.

It will be observed that during the film transition from position No. 3 to position No. 4 (or during the third scansion of frame 1), the shrunken film will disadvantageously halt directly in the center of this third scansion cycle. Hence, the television field corresponding to the third scansion of frame 1 will necessarily be November 4, 1941, an illuminated flying spot raster 28 is produced on the screen 30 of a kinescope 18 through the appropriate actions of horizontal and vertical deflection circuits 32 and 34. The lens 36 collects the light rays from the flying spot pattern 28 and projects them for deflection onto the surface of the rocking mirror 38. After being deflected by the rocking mirror 38 an image of the scanning pattern 28 is brought to focus upon the film 10. In the position shown in Figure 1, the image 28' of the scanning pattern 28 is disposed for scansion of an arbitrarily designated film area such as frame 1. Directly to the rear of the film 10 is the photoelectric cell 40 which receives the light rays of the scanning pattern image 28' after passing through the film and afterward being collected by the lens 42. Through suitable electronic circuits the output of this photocell is adapted to produce a television signal corresponding to the photographic information on film 10 as the flying spot comprising the pattern 28 describes the scanning pattern 28'.

As is well known to the art in a continuous film scansion apparatus of this type, one procedure for resolving 24 frame per second film presentation rate to the RMA standard 60 field per second television standard, as is presently commercially employed in the United States, is to drive the film 10 at a 24 frame per second rate and then scan successive film frames three and two times respectively. For example, frame 1 may be scanned three times corresponding to 3/60 of a second and frame 2 scanned two times corresponding to the remaining 2/60 of a second, which comprises the 5/60 or 1/12 of a second period required for the presentation of two film frames.

Referring now to Figure 2 in combination with Figure 1, the film 10 is shown in discrete positions Nos. 1, 2, 3, 4, 5, and 6 as it is successively displaced longitudinally along the film gate in the direction of the arrow 12. For ease in describing the nature of the operations to follow, the index level 44 on the film gate 16 in Figure 1 is represented by line 44' described on the ordinate 2a of the graph in Figure 2. The ordinate 2a represents longitudinal film gate distance and the arrow 12 associated therewith again describes the direction of motion of the film relative to the film gate as it is projected. The index level 44' is conveniently taken as a starting position for the top of frame 1 (position 1) at the start of the triple scansion of frame 1. Here it will be remembered that in the normal projection of motion picture film, the top of the image photographed on the film frame is actually below the bottom of the film frame image due to the inversion of the motion picture film. Consequently in Figure 1, the image top, which will be referred to as simply "the top of frame 1," is coincident with the arbitrary index 44 on the film gate 16. The rocking mirror 38 is then oriented so that the top of the scanning pattern 28 is also coincident with the index line 44 and at the time zero or the beginning of film scansion, represented on abscissa 2b of Figure 2, the fluorescent spot on the scanning pattern 28 proceeds to scan the film 10 as the film 10 moves on to position No. 2. Study will show that the longitudinal height of the scanning pattern image 28' as projected on the film 10, need be only 3/5 of a frame height to accomplish scansion of frame No. 1 by the time the film reaches position No. 2. The longitudinal position of the electron beam spot image, comprising the scanning pattern image 28', as it progresses in a direction opposite to film motion to execute its field scansion is represented by a locus line 46 in Figure 2. Therefore in the first 1/60 of a second, which is the transition time between position No. 1 and position No. 2, film frame 1 is properly scanned the first of three times.

Since the scanning pattern image 28' in scanning a frame must always have its genesis coincident with the top of the frame image, the second scansion of frame 1 in its position shown by position No. 2 of the film 10, will require that the scanning pattern image 28' be shifted downwardly in the direction of film motion to position "b," whereas for the first scansion its genesis was established at level "a" which was coincident with the index level 44'. This necessary shifting of the scanning pattern is accomplished by the action of cam 50 acting upon the follower 52 which is in turn disposed to rotate the mirror 38 about its axis 38'. The five constant radius surfaces, designated as $a$, $b$, $c$, $d$, and $e$ on the cam 50 correspond to the necessary levels to which the genesis of the scanning pattern 28' must be shifted throughout the five part scansion cycle of the film 10. The cam 50 receives rotational drive in synchronism with the film driving sprocket by means of an appropriate mechanical linkage to the motor 24 indicated by line 54.

The cam position as shown in Figure 1 corresponds to the first scansion of film frame 1. However, for the second scansion of film frame 1, constant radius surface $b$ will displace rotor 52 away from the cam axis so to shift the scanning pattern 28' to level $b$ (in Figure 2) from which position the second scansion of frame 1 progresses and continues until the film reaches position No. 3. The third scansion of film frame 1 of course, is accomplished in a similar manner during the transition of the film between position No. 3 and position No. 4 during which scansion constant radius $c$ of cam 50 has properly positioned the scanning pattern.

It is seen then that at the end of 3/60 of a second, frame 1 has been scanned the required three times and cam 50 then presents constant radius surface $d$ of smaller radius, to the mirror follower 52 so as to raise the genesis of the scanning pattern 38' to level $d$ (Figure 2) along the film gate in order to make ready for the first scansion of frame No. 2. This first scansion of frame 2 is accomplished during the transition of the film from position No. 4 to position No. 5. The second scansion of frame 2 then follows by positioning of the follower 52 in conformation with constant radius $e$ of the cam 50 which maintains throughout the interval between position No. 5 and position No. 6. At the end of 5/60 of a second corresponding to position No. 6 of the film, scansion of both frame 1 and frame 2 has been properly accomplished and the scanning raster returns to the index level $a$ or index 44' in readiness for the triple scansion of frame 3.

Considering now in more detail the graphical representation in Figure 2, it may be seen that the dashed line 58 represents the locus of the top of frame 1 whereas the dashed line 60 represents the bottom of frame 1 and/or the top of frame 2. Dashed line 62 accordingly, represents the bottom of frame 2 and/or the top of frame 1. Consequently, the slope of the non-horizontal portions of lines 58, 60, and 62 represent the linear velocity of the film 10 in its propulsion through the scansion system of Figure 1. The straight line sections of curve 46 of Figure 2, hereinbefore described as representing the vertical progression badly distorted and consequently not agree in registration with the scansions of the same frame accomplished during the first two field scansions of that frame. In the case of film frame 2, it is apparent that this halting or suspension of film motion due to film shrinkage effects, although occurring at 58'b, 60'b, and 62'b does not yield any deleterious effects inasmuch as they occur at the end of a television field scansion. For this instance in particular, the suspensions of motion begins at $5/60$ of a second, which is equivalent to $2/24$ of a second, or the time taken for television scansion presentation of two complete film frames. The reasons that no ill effects are felt from this film hesitation at this time, derives wholly from the fact that a television vertical blank out signal occurs at every $1/60$ of a second or at a time when no video image information is being transmitted or reproduced.

Figures 4, 9:
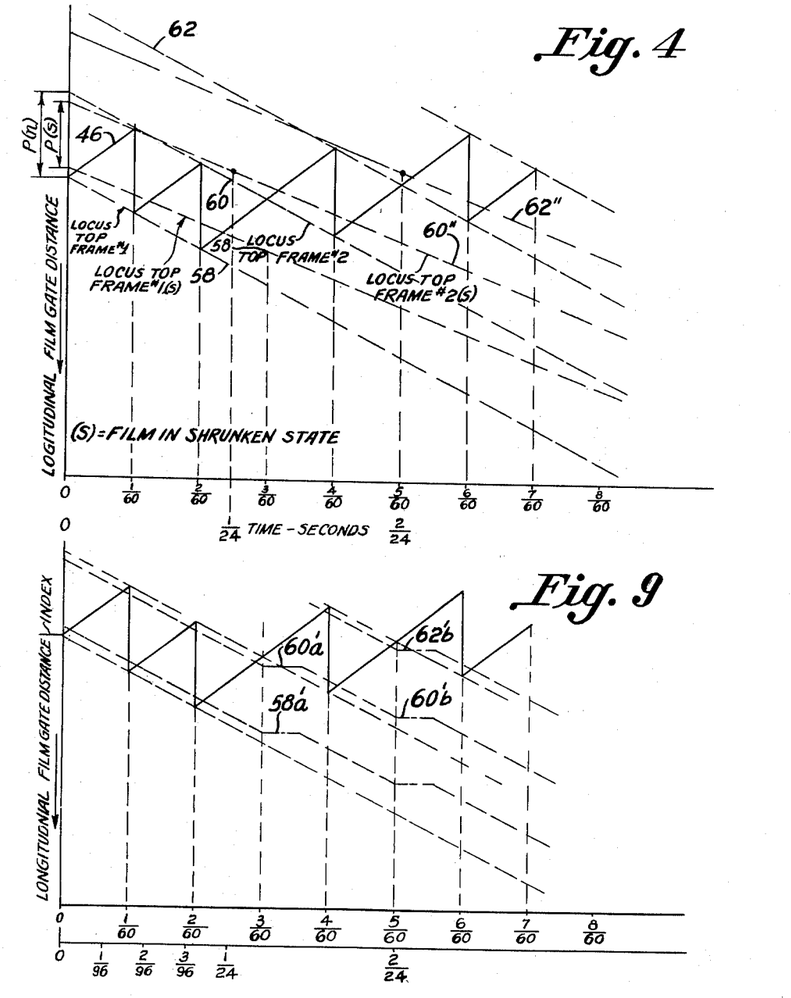
Figure 4 graphically illustrates the mechanical functions set forth in Figure 2 in connection with a particular form of abnormal mechanical operation of the apparatus in Figure 1 due to film shrinkage.
Figure 9 graphically illustrates the mechanical functions of the apparatus in Figure 1 when employing one form of the present invention.

Therefore in accordance with the present invention the hesitation in film movement normally occurring at $1/24$ of a second as in Figure 3, is eliminated and postponed to occur at $3/60$ of a second as shown at 58'a and 60'b in Figure 9. Consequently, the necessary slippage of the film to make up for the shrinkage when postponed to occur at intervals of $3/60$ and $2/60$ of a second may be made to occur during television blank out intervals, during which hesitation of the film will create no problem.

From the foregoing analysis it appears that it is only necessary to insure postponement of only one film motion suspension due to shrinkage, namely, that suspension corresponding to the ends of frames 1, 3, 5, 7 and so forth for operation as described in Figures 2 and 3, since the suspension occurring at the ends of frames 2, 4, 6, 8, etc. are of less concern. In most instances however, it is desirable also to provide additional means for insuring that the film motion suspension occurring at the ends of even numbered frames are initiated at exactly those 24th of a second intervals which coincide with the 60th of a second intervals such that the duration of the film suspension does not "hang over" the television blank out time.

It may be noted at this time that if 35 mm. film were being driven by successive driving perforations numbering four per frame, the hesitations or film shrinkage compensatory motion suspensions would occur at every $1/94$ of a second and in accordance with Figure 3 the phenomenon illustrated at 58'a—60'a—62'a in connection with 16 mm. film would occur four times during the scansion of frame 1 which occurrent positions are indicated by dots 90, 91, 92, as well as at 58'a. The distortion of the television images would therefore be markedly greater under these conditions. The obvious correction for this increased effect would be to provide active engagement of only one out of every four driving perforations by the sprocket for the 35 mm. film. Under such driving conditions for the 35 mm. film the remaining problem is identical to that as described in connection with 16 mm. film.

Figure 8:
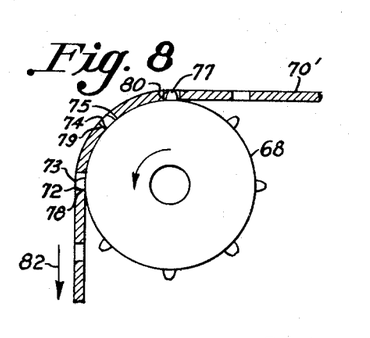
Figure 8 diagrammatically illustrates the mechanical relationship between a normal driving sprocket and shrunken motion picture film.

The teeth of the sprocket 68 shown in Figures 7 and 8 are illustrative of the very simplest form of sprocket tooth contours and no effort has been made to illustrate a type of tooth contour which would tend to minimize the abruptness at which the hereinbefore described shrinkage compensatory interruptions occur. Certain types of film sprocket tooth contours which tend to minimize the ripple or flutter imparted to the film due to the necessary shrinkage compensations are well known to the art and find particular usefulness in film systems incorporating sound track reproducing equipment. Such sprockets operate to impart a substantially constant rate of propulsion to the film under two conditions, to wit; for film exhibiting no shrinkage or for film exhibiting a discrete amount of shrinkage, under which latter conditions the sprocket necessarily reduces the average linear velocity of the film in the process of compensating for the shrinkage. The exact mechanism by which these types of sprockets operate are normally based upon particular forms of tooth contour designs and will not be herein considered in detail due to the familiar nature of such devices to those skilled in the art. However, it is to be noted that although such special "smoothing" sprockets operate to "smooth out" film flutter due to shrinkage effects and thereby impart to the film a constant but lower rate of propulsion, the registration problems resulting from shrinkage effects are in no way helped by the use of such sprockets.

The effect of a "smoothing" sprocket operating under ideal conditions to effect a reduced but constant velocity propulsion, free of "flutter," of shrunken film in connection with a television film scansion mechanism as described in connection with Figure 2, is illustrated in Figure 4. Again a portion of Figure 2 has been reproduced in Figure 4 to form a basis for comparison between conditions obtaining under operation with shrunken and unshrunken film. Accordingly, dashed loci lines 58, 60, and 62 again represent respectively the loci of the tops of frames 1, 2, and 3 as normal unshrunken film would be propelled through the system as illustrated in Figure 2. The pitch or distance between frames is here indicated by the arrow $P_n$ which is indicated for comparison with the pitch $P_s$, illustrated for film in a shrunken state. Correspondingly, the "dashed dot" lines 58'', 60'', and 62'' represent the respective loci of the tops of frames 1, 2, and 3 of shrunken film as it is propelled through the system shown in Figure 1 at a reduced constant velocity rate resulting from the action of an idealized special "smoothing" sprocket. Indeed the situation resulting in this case is even more aggravated from a registration standpoint than was exhibited in connection with the simple tooth action illustrated in Figure 3, for it is evident that whereas the first two scansions and a portion of the third scansion of frame 1 were in registration in Figure 3, here each successive scansion of frame 1 is displaced from the previous scansion and in registration therewith. Although in Figure 4 no particular distortion of the third scansion field of frame 1 is encountered due to sprocket tooth action in connection with shrunken film, it is seen that the cumulative action of the reduced but constant velocity of film propulsion results in successively deeper scansions into frame No. 0 during the intended three scansions of only frame 1. Manifestly then, the mere provision of constant velocity propulsion of the film at a reduced rate to compensate for linear shrinkage effects, in no way improves successive field registration in scansion systems of the type under consideration whereas controlled interruptions of the film motion according to the method disclosed and illustrated in Figure 8 do provide satisfactory correction of film shrinkage effects through the medium of the film driving mechanism.

Figure 10:
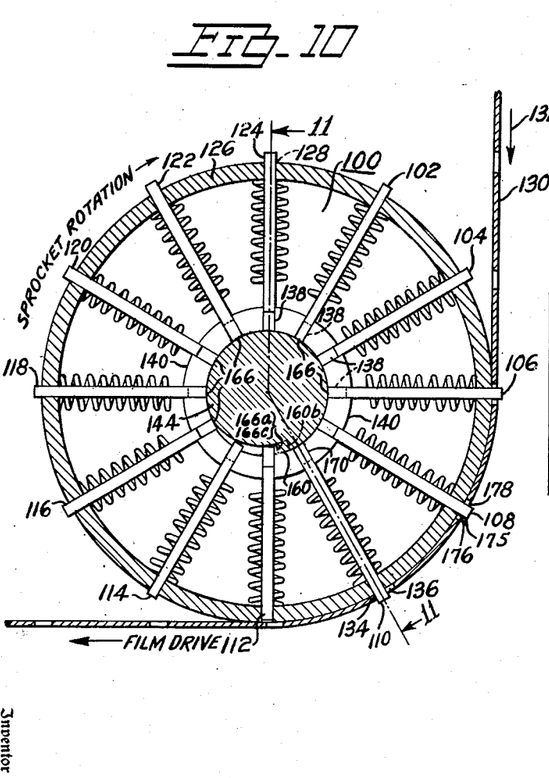
Figure 10 is a cross-sectional axial view of one form of film driving sprocket embodying features in accordance with the present invention.
Figure 11:
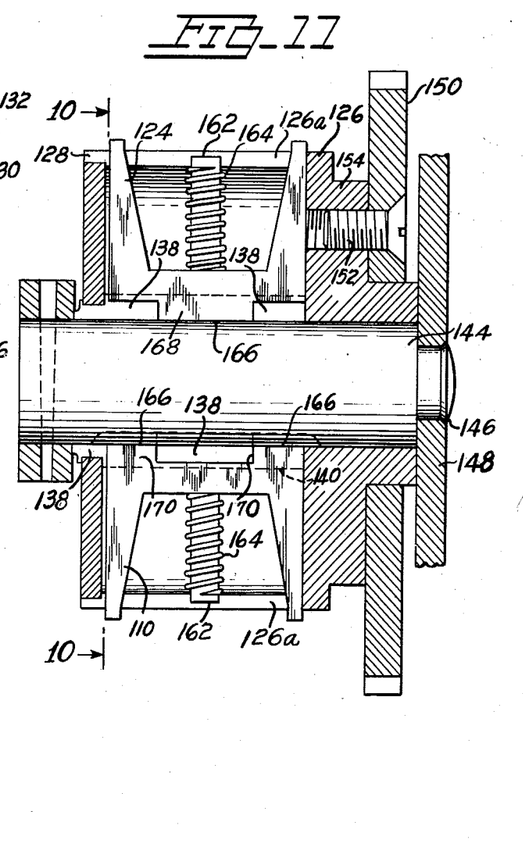
Figure 11 is a staggered sectional side view of a portion of the sprocket represented in Figure 10 taken on line 11—11 thereon and looking in the direction of the arrows.

According to the present invention in order to provide the necessary postponement of film shrinkage compensatory halts to ensure motion suspension at every 3/60 and 2/60 of a second for alternate film frames, a novel driving sprocket 100 shown in Figure 10 and Figure 11 may be used. The driving sprocket 100 is provided with an even number of driving teeth 102, 104, 106, 108, 110, 112, 114, 116, 118, 120, 122, and 124 which may be radially extended or extracted from protrusion past the outer surface of the drum 126 through peripheral slots therein. Each of the peripheral slots such as 128 (for sprocket tooth 124) through which the sprocket teeth extend is preferably parallel with the rotational axis of the sprocket and is of sufficient width to allow the sprocket tooth member such as 124, to freely move therein. As is shown more particularly in Figure 10, the sprocket teeth are evenly spaced around the sprocket periphery with a nominal pitch suitable for normal driving engagement of unshrunken motion picture film. For purposes of illustration, however, the film 130 being driven by the sprocket in the direction of the arrow 132 is shown as having suffered some degree of shrinkage which permits driving thereof by only one sprocket tooth at a time. In the particular operational phase shown, the tooth 110 is driving the leading edge 134 of the film perforation 136 but the remaining sprocket teeth enveloped by film perforations, provide no driving force to the film due to its shrunken condition.

Figure 12:
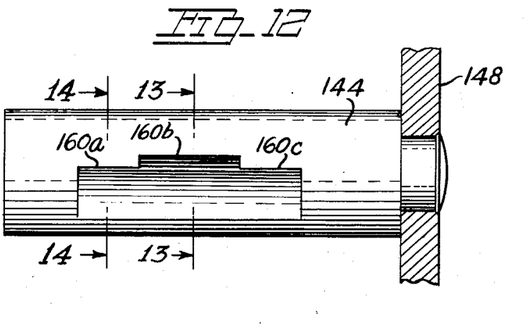
Figure 12 is a detailed elevational side view of the combination control cam and sprocket axle shown in Figures 10 and 11.
Figures 13, 14:
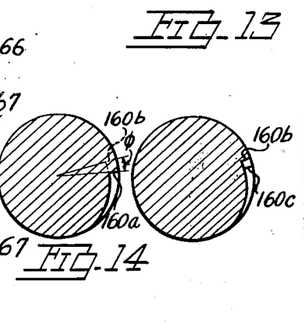
Figure 13 is a cross-sectional axial view of the element shown in Figure 12 taken on the line 13—13 thereon and looking in the direction of the arrows.
Figure 14 is a cross-sectional axial view of the element illustrated in Figure 12 taken on the line 14—14 thereon and looking in the direction of the arrows.

The individual sprocket teeth whose general form are shown more clearly in Figure 11 are guided for radial movement by a series of slots such as 138 in the central hub 140. These slots are in radial alignment with the slots in the drum periphery. The sprocket as a whole, comprising the drum 126, the hub 140 and the sprocket teeth movable therein, is rotated about a combination control cam and axle 144, which is held stationary relative to the scansion apparatus by such means as its riveting at 146 to a convenient apparatus structural plate 148. Rotational driving force is applied to the sprocket 100 by means of a gear or pulley 150, which is fastened by means of a series of bolts such as 152 to the hub and drum support member 154. Consequently, rotational drive of the gear 150 about the fixed axle 144 will cause the drum 126 and the hub 138 with the sprocket teeth therein to also rotate. It will be observed, however, and as more clearly shown in Figures 12, 13, and 14, that the axle 144 has, on its periphery, a 2-section control cam surface comprising peripheral depression 160A, 160B, and 160C. The nature of this compound control surface is more clearly described by cross-sectional views shown in Figures 13 and 14 taken from Figure 12 at lines 13 and 14 respectively and looking in the direction of the arrows associated therewith. The depressions 160 can therefore be seen to be very abrupt and having edges which are definable by a plane passing through the rotational axis of the sprocket. Surfaces 160A and 160C are in relative alignment such as to be mutually included in a radially extending plane in turn including the sprocket rotational axis, whereas surface 160B is angularly displaced by an angle $\phi$, in a direction opposite to sprocket rotation, from the plane defined by the edges 160A, 160C and the sprocket axis.

Accordingly, there is provided on each sprocket tooth a central extension 162 surrounded by a spring 164 (reference, for example, teeth 110 and 124 in Figure 11). The spring acts upon the inside surface 126A of the drum 126 to maintain the actuating surfaces 166 of the sprocket teeth in contact with the periphery of the sprocket axle 144 such as to cause the radial displacement of the sprocket teeth in accordance with the depressions 160A—160C and 160B on said axle. Consequently, as the sprocket 100 is rotated about the axle, the sprocket teeth, when they encounter the appropriate control surface depressions, will move inwardly away from the drum surface 126 and therefore destroy any driving relationship that might exist between the particular tooth encountering the depression and a film driving perforation.

As will be remembered in connection with Figure 9, the film in its travel through the scansion mechanism is ideally halted at alternate intervals of 3/60 of a second and 2/60 of a second, said halt intervals being timed to commence at the terminations of the respective final scansions of alternate film frames. In other words, the durations of time intervals during which alternate film frames are to receive constant velocity propulsion is to differ by 1/60 of a second. This action is accomplished in the present sprocket by shaping the actuating ends of alternate sprocket teeth to respectively conform to the depression 160A—160C and the depression 160B. For instance, tooth 124 has a single actuating protuberance 168 so dimensioned and oriented to respond only to the control cam surface depression 160B, whereas the alternate type of tooth (of the type depicted by tooth 110) has two actuating protuberances 170, which conform only to the control cam surface depressions 160A and 160C. As before noted in the operational phase of the sprocket as shown in Figure 10, the tooth 110 is providing a driving force to the film by contact with the leading edge 134 of the film perforation 136. Therefore, when the two actuating protuberances 170 encounter surface 160A—160C, the sprocket tooth will retract to a position now illustrated by tooth 112 and consequently allow the film 130 to halt until the leading edge 175 of tooth 108 contacts the leading edge 176 of the film driving perforation 178. At this latter time, the film will again be propelled at a constant velocity. This newly established constant velocity propulsion will continue until tooth 108 (having a single actuating protuberance such as tooth 124) encounters actuating surface depression 160B, at which time it will retract and allow the film to hesitate in its movement until tooth 106 moves sufficiently forward to contact the leading edge of the driving perforation within which it acts. It is therefore evident that teeth 102, 106, 110, 114, 118, and 122 will provide drive to film for longer individual periods, than teeth 104, 108, 112, 116, 120 and 128. This additional driving period is expressed by:

$$\Delta t = \frac{2\phi}{(360)Vs} \text{ seconds}$$

where $\phi$ is equal to the angular displacement in degrees between surface depression 160A—160C and surface depression 160B, taken about the rotational axis of the sprocket; and $Vs$ is equal to the rotational velocity of the sprocket expressed in revolutions per second.

In accordance with the above, where the film 130 is to be driven at a 24 frame per second rate and where 16 mm. film is under consideration (representing one set of film perforations per frame) the sprocket 100 having 12 teeth will necessarily be rotated at 2 revolutions per second. The required time differential $\Delta t$ being 1/60 of a second, then allows the determination of the proper angular displacement of the cam surface depressions by simple rearrangement and substitution in the above expression:

$$\phi = \frac{\Delta t(360)(Vs)}{2} = \frac{(360)(2)}{(60)(2)} = 6 \text{ degrees}$$

Figure 15:
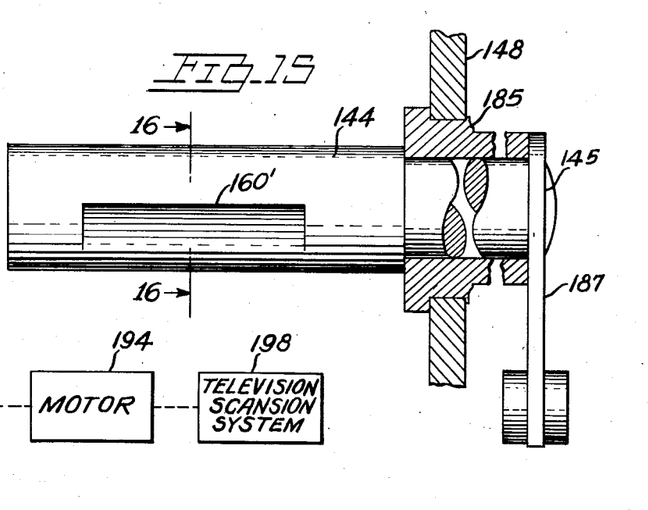
Figure 15 illustrates another form of combination control cam and sprocket axle as may be used in a modification of the sprocket shown in Figures 10 and 11.
Figure 16:
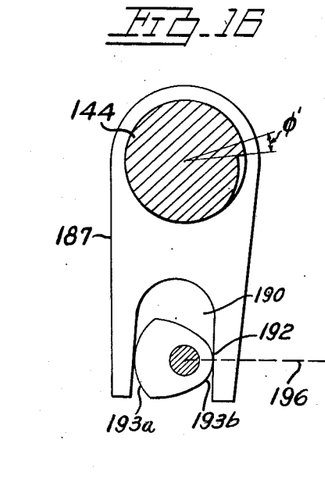
Figure 16 is a cross-sectional axial view of the apparatus in Figure 15 taken on the line 16—16 and looking in the direction of the arrows thereon; the showing of certain elements being omitted for purposes of clarity.

Instead of providing what is in effect two cam surfaces on the axle 144 with the required critical 6 degree angular displacement therebetween as well as providing special contours for the actuating ends of alternate sprocket teeth, some simplification may be realized through an arrangement similar to that shown in Figures 15 and 16. Here the axle 144, instead of being fixed to the supporting member 148 (as in Figures 11 through 12), is rendered rotatable with respect to the apparatus by means of bearing 185. A driving arm 187, fastened rigidly to the axle 144 at 145, has an opening 199 which is made to conform to the peripheral surface of a rotating driving cam 192. Driving cam contour is such as to cause oscillatory rotational displacement of the axle 144 through an angle $\phi'$. The control surface on the axle 144 may then comprise a single simple depression 160' and the actuating ends at 166 of the sprocket teeth may then all be uniform. The motor 194 which drives the cam 192 through mechanical linkage indicated by dotted line 196, is in turn held in synchronism with the televison scansion system indicated by the block 198 such that the axle cam surface 160' is rendered stationary just prior to and during the retraction of a sprocket tooth from driving engagement with the film. Such action is provided, for example, by the circular peripheral sections 193A and 193B of the control cam 192.

In the above embodiments although specific contours of the actuating ends of the sprocket teeth and axle cam periphery as well as the specific arrangement of sprocket teeth for radial displacement relative to the sprocket axis of rotation are shown, other workable mechanical arrangements embodying the novel features of the sprocket arrangements herein shown, will occur to those skilled in the art after having benefited by the teachings of the present invention.

From the foregoing description it is seen that the applicant has provided an improved form of film shrinkage compensatory driving sprocket which lends itself particularly to television scansion apparatus. The sprocket is simple and economical in construction and is advantageous from the standpoint of the relatively large tolerance with which the majority of the structure may be fabricated.

I claim:

1. A driving sprocket for a motion picture film television scansion apparatus said sprocket comprising an outer supporting member having a cylindrical outer surface containing a plurality of holes, a central supporting member positioned concentrically within said outer supporting member and rigidly connected therewith said central member containing a plurality of restraining holes in radial alignment with the holes in said outer supporting member, a plurality of sprocket teeth disposed to outwardly radially extend through said radial aligned holes, each tooth having a driving and an actuating end, said driving end being conformed for active engagement of motion picture film driving perforations, a cam having its axis in alignment with the rotational axis of said outer supporting member and positioned within said inner central supporting member for linearly positioning said sprocket teeth in said radially aligned supporting holes through driving engagement of said sprocket teeth actuating ends and the cam periphery, said cam periphery comprising two control surfaces, and a spring mechanism connected with each sprocket tooth for maintaining said driving engagement of said tooth with said cam said sprocket teeth actuating ends having slots therein for discriminately responding to one of said cam control surfaces.

2. A cylindrical sprocket having plurality of teeth extending therefrom for engagement with driving perforations in a substantially uniform sheet of material, said sprocket comprising a rotary supporting member having a cylindrical outer surface provided with a plurality of holes, a plurality of sprocket teeth disposed to extend through the holes from within to without said supporting member, the longitudinal axis of each tooth being in alignment with a line extending radially from the rotational axis of said supporting member, each tooth having a driving end and an actuating end, said driving end being conformed for driving engagement of the sheet driving perforations only when said driving end extends beyond the limits of said supporting member outer surface, and a driving member within said supporting member comprising a rotatable cam with a plurality of peripheral control surfaces, the actuating ends of predetermined groups of said sprocket teeth being mechanically keyed to discriminately conform to one or more of said control surfaces, and a spring mechanism connected with each tooth so as to maintain driving engagement of said sprocket teeth actuating end.

3. A driving sprocket for motion picture film said sprocket comprising a cylindrical outer supporting member having a plurality of holes uniformly spaced about the circumference thereof, a central supporting member positioned within said outer supporting member and rigidly connected therewith, the central supporting member having a corresponding plurality of holes therein in radial alignment with the holes in said outer supporting member, a plurality of sprocket teeth disposed to radially extend through said radially aligned holes in said cylindrical surface and said central supporting member, each tooth having a driving end and an actuating end, said driving end being conformed for active engagement of motion picture film driving perforations, said teeth being further disposed to normally place said driving ends beyond the limits of said outer supporting member outer surface in position for active engagement with motion picture film driving perforations, and a driving member within said outer supporting member for linearly positioning said sprocket teeth in said aligned supporting holes by means of driving engagement with the actuating ends of said sprocket teeth, said driving member being so conformed to produce retraction of successive teeth one at a time beneath the outer supporting member limits and hence from driving engagement with the driven film, and means to cause said sprocket teeth driving ends to conform to said driving member.

4. Apparatus as defined in claim 3 wherein said driving member is a rotatable cam having its rotational axis in alignment with a rotational axis of said sprocket, said cam having a peripheral control surface adapted to provide suitable displacement of said sprocket teeth when said cam is given rotational displacement with respect to said outer supporting member, and comprising in addition, a spring mechanism connected with each tooth such to maintain driving engagement of said sprocket teeth actuating ends with said cam control surface.

5. Apparatus set forth in claim 3 wherein said driving member is rotatable about the rotational axis of said outer supporting member, and an axial extension from said driving member for rotational positioning said driving member relative to said outer supporting member.

6. Apparatus according to claim 3 wherein said driving member is rotatable about the rotational axis of said outer supporting member and an axial extension from said driving member for rotational positioning said driving member relative to said outer supporting member, wherein there is additionally provided an activating mechanism connected with said axial extension, a synchronizing linkage between said activating mechanism and said outer supporting member whereby periodic rotational displacement of said driving member is effected during propulsion of motion picture film by said sprocket.

7. Apparatus as to claim 3 wherein said driving member is a cam with a multiplicity of peripheral control surfaces, and wherein said sprocket teeth actuating ends are keyed to discriminately respond to one or another of said rotatable cam peripheral control surfaces, and means to cause said sprocket teeth driving ends to conform to driving member.

8. Apparatus as defined in claim 7 wherein the said plurality of teeth is even in number and wherein alternate sprocket teeth actuating ends are conformed for response to one cam control surface only while the remaining alternate sprocket teeth actuating ends are conformed for response to the other cam control surface, such that propulsion of the film through the scansion apparatus is effected by driving engagement of the sprocket and the film by only one tooth at a time.

KNUT JOHAN MAGNUSSON.

REFERENCES CITED

The following references are of record in the file of this patent:

UNITED STATES PATENTS

| Number | Name | Date |
|---|---|---|
| 1,904,068 | Meacock | Apr. 18, 1933 |
| 2,277,156 | Sherman et al. | Mar. 24, 1942 |
| 2,401,596 | Winter | June 4, 1946 |
| 2,401,597 | Winter | June 4, 1946 |
| 2,402,074 | Nield | June 11, 1946 |

FOREIGN PATENTS

| Number | Country | Date |
|---|---|---|
| 204,262 | Germany | Nov. 16, 1908 |
| 89,630 | Austria | Jan. 15, 1922 |